Feb. 22, 1927.
W. DORNIG
1,618,411
ELECTRICAL FREQUENCY MULTIPLYING SYSTEM
Filed Sept. 24, 1925
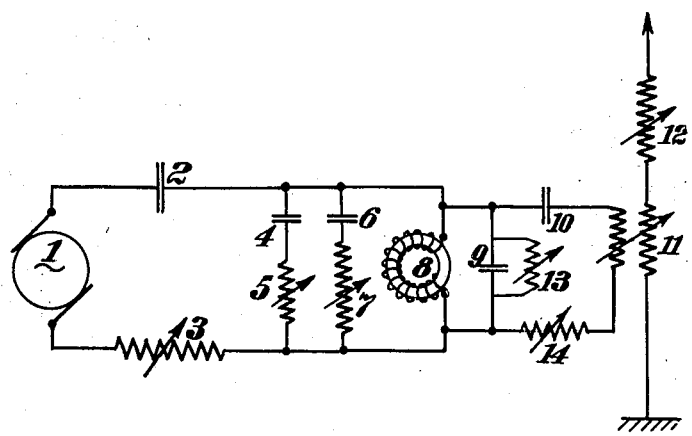

Patented Feb. 22, 1927.

1,618,411

UNITED STATES PATENT OFFICE.

WALTER DORNIG, OF BERLIN-STEGLITZ, GERMANY.

ELECTRICAL FREQUENCY-MULTIPLYING SYSTEM.

Application filed September 24, 1925. Serial No. 58,261.

My invention relates to electrical frequency multiplying systems, more especially for wireless signalling. The invention will be described with reference to the accompanying drawing the single figure of which shows the diagrammatic connections of the members required for the production of a maximum efficiency in a frequency multiplying system.

A source of high frequency current is shown at 1 to which frequency the main circuit is tuned by the capacity 2 through the frequency transformer 8 and the inductance 3 as described in applicant's prior application Ser. No. 519,325. An oscillation circuit is connected to the frequency transformer 8, which circuit with the capacity 6 and the large inductance 7 has substantially the same individual oscillation as the main circuit of the source of current as described in applicant's application Ser. No. 684,109. This auxiliary circuit improves the efficiency of the system. The same action is shown by the other parallel auxiliary circuit, which with the capacity 4 and the inductance 5 is tuned through the frequency transformer 8 to a harmonic oscillation which is lower than the secondary working frequency as described in the U. S. Patent 1,545.040. The main circuit 1, 2, 3 may for example be adjusted to about 10,000 periods per second, the auxiliary circuit 6, 7, 8 also to substantially the same frequency and the other auxiliary circuit 4, 5, 8 to the intermediate frequency of 70,000 periods. The secondary circuit 8, 10, 11 connected to the frequency transformer and the aerial connected therewith, possibly with an intermediate circuit (not shown), has to be tuned to the desired harmonic oscillation of 290,000 periods. Such arrangement is described in the above mentioned specifications.

The present invention consists in connecting a condenser 9 to the frequency transformer, the capacity being of such value that it takes up the energy impulses supplied by the transformer—in the same way as from a spark-gap—and again gives it out to the secondary circuit 9, 10, 11 tuned to 290,000 periods, in which case the inductance 11 can be replaced by a separate coupling coil and an independent tuning inductance 14. It has been shown that the transformer only gives out its maximum energy when there exists between it and the parallel condenser 9 no external inductance other than that of the transformer, that is, the coupling must be 100%. If the condenser 9 be omitted and the transformer winding 8, the condenser 10 and the coupling coil 11 together constitute the secondary circuit, then owing to the inductance 11 required for coupling, the 100 per cent coupling no longer exists. and the frequency transformer no longer yields full energy; it becomes hotter, the efficiency is worse.

The frequency transformer gives out maximum energy when the capacities 9 and 10 and the inductance 11 constitute an energy circuit carrying the aerial frequency, which circuit is merely connected capacitatively with the frequency transformer.

The connection of a capacity to a transformer is known per se; but the purpose and consequently the value thereof in the previous arrangements was different from that in the present case. For example, in the British specification No. 181,909 it is stated at the top of the page 2 that the inductance of the transformer with the parallel capacity should be resonant to a wave length of ½ to ⅔ of the fundamental. The capacity is therefore very large and passes a large current of primary frequency which must serve for magnetizing the transformer and unloading the machine, therefore improving the power factor $\cos \theta$.

In the present invention on the contrary the capacity connected in parallel must be only comparatively small, so that almost no current of fundamental frequency or very little such current passes through it. For if the capacity were chosen so large as is the case in the specification mentioned by way of example and in other similar specifications, then the primary current would in part flow through the condenser and eventually there would be no saturation in the frequency transformer which results in such distortion that the gain in form of a harmonic corresponds to the full efficiency of the transformer.

For high frequency conversions resulting in short waves the application of the parallel condenser is very simple. For low conversions, however, the parallel condenser 9 would have to be made relatively large, as it must be approximately tuned with the self-induction of the transformer 8 to the secondary or out-put frequency and, therefore, means must be used causing the current of primary frequency to find its path through the parallel condenser 9 barred. This possibility is afforded by the so-called frequency trap. For example a large inductance 13 can be connected in parallel with the condenser 9 in such way that both such tuning members constitute a resonant circuit or frequency trap tuned to the primary frequency.

Having now particularly described and ascertained the nature of my said invention and in what manner the same is to be performed, I declare that what I claim is:—

1. In a frequency multiplying system employing highly saturated iron cores, the combination of a primary circuit comprising a high frequency source, tuning means and a frequency transformer, a secondary circuit carrying the transformed higher frequency current and comprising tuning means, with a parallel capacity directly connected to the terminals of the said frequency transformer, the said capacity having such a value that almost no or only little low frequency primary current passes through it.

2. In a frequency multiplying system employing highly saturated iron cores, the combination of a primary circuit comprising a high frequency source, tuning means and a frequency transformer, a secondary circuit carrying the transformed higher frequency current and comprising tuning means, a parallel capacity directly connected to the terminals of the said frequency transformer, the said capacity having such a value that almost no or only little low frequency primary current passes through it, with an auxiliary circuit connected to the said frequency transformer and carrying a frequency of a value between the fundamental and output frequency.

3. In a frequency multiplying system employing highly saturated iron cores, the combination of a primary circuit comprising a high frequency source, tuning means and a frequency transformer, a secondary circuit carrying the transformed higher frequency current and comprising tuning means, a parallel capacity directly connected to the terminals of the said frequency transformer, the said capacity having such a value that almost no or only little low frequency primary current passes through it, an auxiliary circuit connected to the said frequency transformer and carrying a frequency of a value between the fundamental and output frequency with a further auxiliary circuit and also connected to the said frequency transformer and being tuned to a frequency approximating that of, but different from, the said fundamental frequency.

4. In a frequency multiplying system employing highly saturated iron cores, the combination of a primary circuit comprising a high frequency source, tuning means and a frequency transformer, a secondary circuit carrying the transformed high frequency current and comprising tuning means, a parallel capacity directly connected to the terminals of the said frequency transformer and a high self-induction connected in parallel to the said capacity and constituting with it a frequency trap for the said fundamental frequency.

In testimony whereof I have affixed my signature.

WALTER DORNIG.